(No Model.)
W. JENISCH.
GRINDING MILL.
No. 367,043. Patented July 26, 1887.
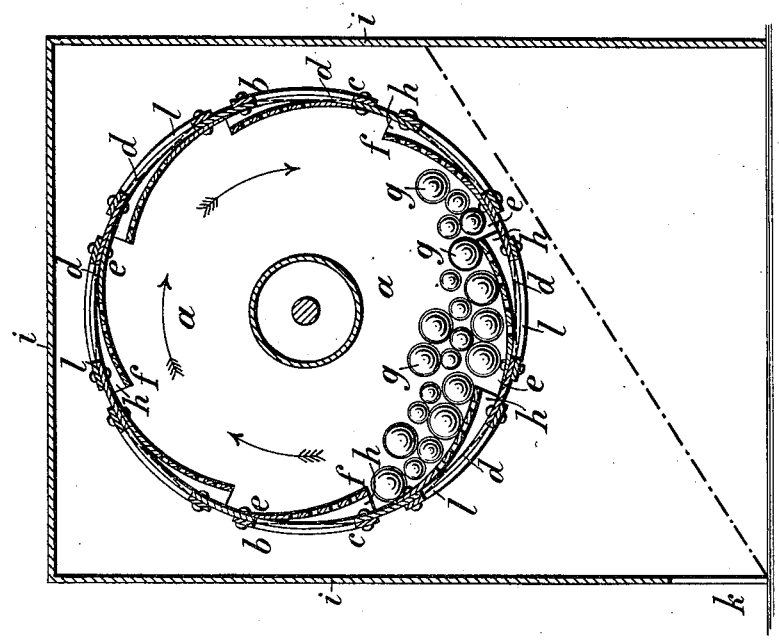
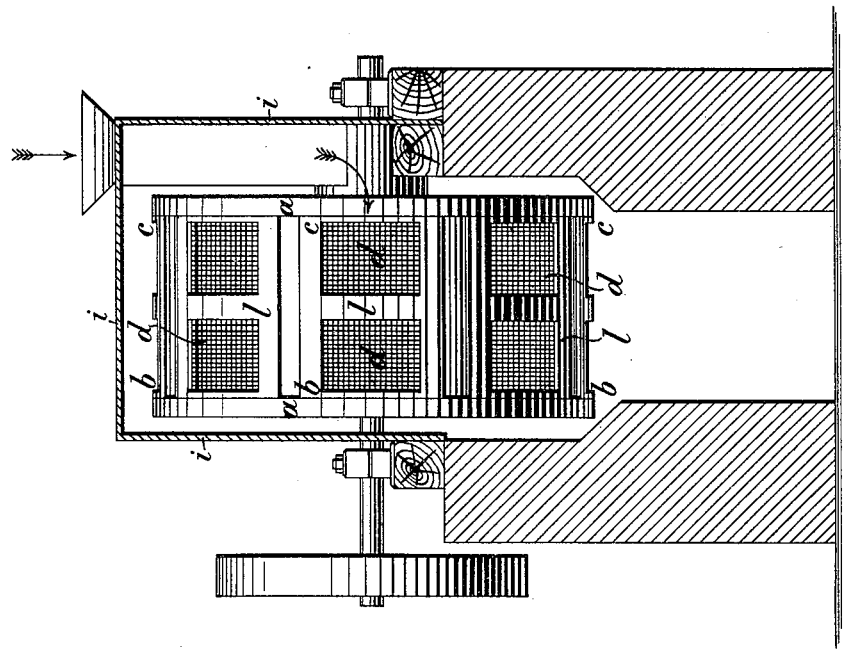
Witnesses:
August Mühle,
Gustav Gsell.
Inventor:
Waldemar Jenisch
by Gerard Wenceslaus Nawrocki Esq
Attorney.

UNITED STATES PATENT OFFICE.

WALDEMAR JENISCH, OF BROMBERG, PRUSSIA, GERMANY, ASSIGNOR OF ONE-HALF TO HERMANN LÖHNERT, OF SAME PLACE.

GRINDING-MILL.

SPECIFICATION forming part of Letters Patent No. 367,043, dated July 26, 1887.

Application filed April 7, 1887. Serial No. 234,078. (No model.) Patented in Germany March 14, 1886, No. 38,036.

*To all whom it may concern:*

Be it known that I, WALDEMAR JENISCH, a subject of the King of Prussia, Germany, residing at the city of Bromberg, in the Kingdom of Prussia, Germany, have invented certain new and useful Improvements in Grinding-Mills, (patented in Germany, No. 38,036, dated March 14, 1886,) of which the following is a specification.

My invention relates to improvements in grinding-mills; and it consists in the construction and combination of parts hereinafter described and claimed.

On the accompanying drawings, Figure 1 is an end elevation of my improved machine, and Fig. 2 a transverse sectional view.

The drum $a$ of the grinding-mill revolves in the direction of the arrows, and has eight equidistant slots in its periphery extending the whole length of the drum on both sides; or it may be interrupted in the middle, as shown in Fig. 1, a fine sieve, $d$, being stretched over the openings. Inside of the drum are the bent perforated inclined plates $ef$, which rise from the periphery and are intended to divert the balls $g$ from a circular path, causing them to exercise a greater force on falling, and simultaneously reduce the material to be ground. The material which has not fallen through the sieve at the lowest part of the drum will, in the further revolution of the same, drop out of the space $h$, and will again, with the other coarser parts, be subjected to the action of the balls. The material to be ground is put into a hopper at the side of the casing $i$, and, after passing through the sieves $d$ and an inclined screen, $m$, under the drum $a$, is drawn off at the opening $k$.

Having fully described my invention, what I desire to claim and secure by Letters Patent is—

A grinding-mill consisting of a rotary drum having longitudinal slots in its periphery and screens covering said slots, said drum being provided on its interior with curved perforated plates, each of said plates being over one of the screen-covered slots and having one side closely fastened to the drum and the opposite side secured at a little distance from the same, in combination with the balls in the drum, substantially as described.

In testimony whereof I have signed my name to this specification in the presence of two subscribing witnesses.

WALDEMAR JENISCH.

Witnesses:
 MAX NAHMMACHER,
 B. ROI.